April 1, 1947.    W. T. LEWIS    2,418,269
TOY HELICOPTER
Filed May 3, 1945
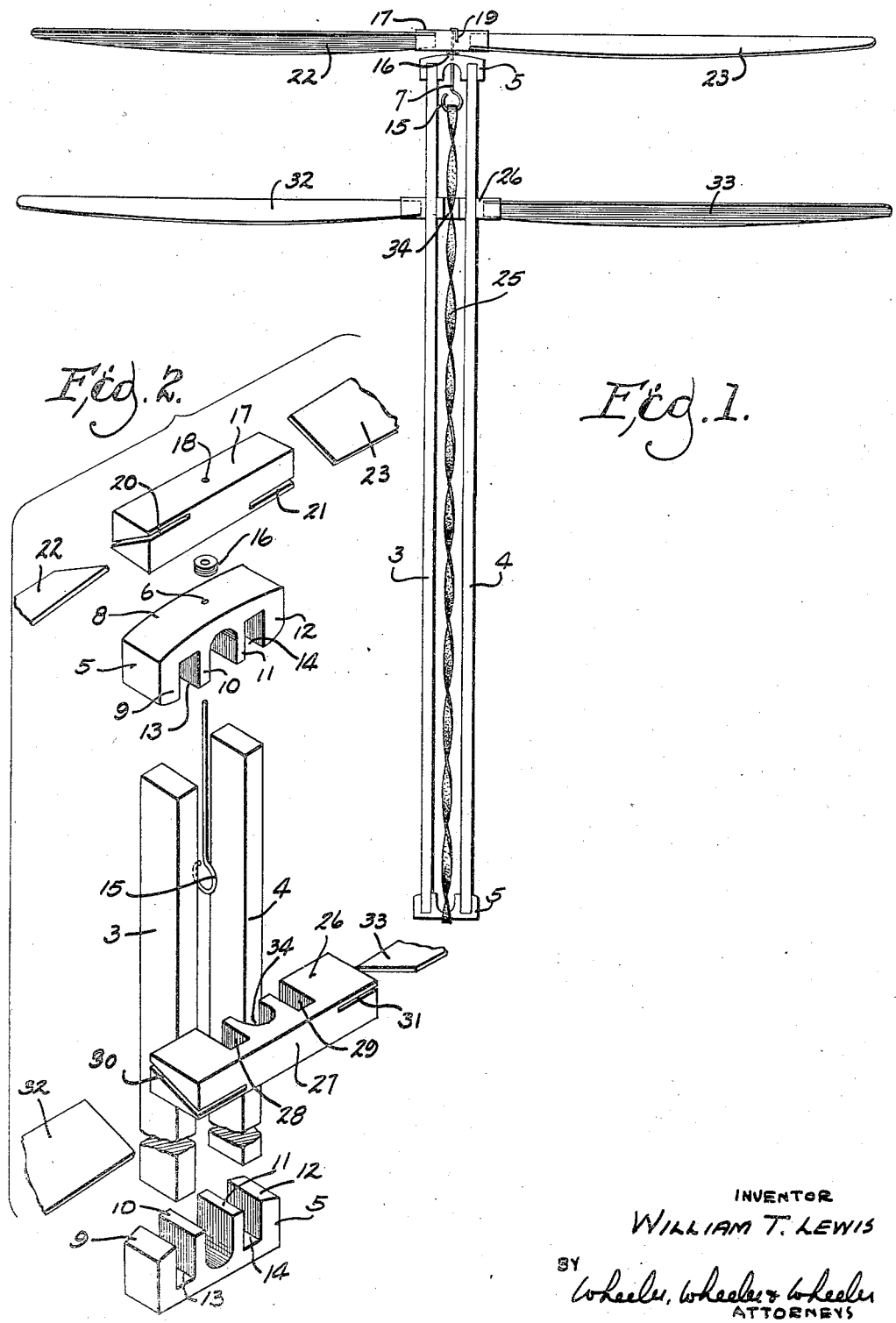
INVENTOR
WILLIAM T. LEWIS
BY
Wheeler, Wheeler & Wheeler
ATTORNEYS Patented Apr. 1, 1947

2,418,269

UNITED STATES PATENT OFFICE 2,418,269

TOY HELICOPTER

William T. Lewis, Racine, Wis., assignor to Whitman Publishing Company, Racine, Wis., a corporation of Wisconsin Application May 3, 1945, Serial No. 591,694

7 Claims. (Cl. 46—75)

This invention relates to improvements in toy helicopters.

It is an object of the invention to provide a novel and improved toy helicopter frame organization facilitating the assembly and disassembly of the frame parts; to provide a helicopter frame of a character particularly adapted for knockdown shipment; to provide a helicopter frame in which a torque reaction propeller fixed to the frame is mounted on a frame member adjustable longitudinally of the frame for best operation; and to provide a device in which flight characteristics are improved by providing propellers of different blade radius and pitch.

Other objects will be apparent from the following disclosure of my invention.

In the drawings:

Fig. 1 is a view in front elevation of an assembled helicopter embodying the invention.

Fig. 2 is a fragmentary detail view in perspective showing the component parts of the helicopter as they appear in position for assembly.

The helicopter frame comprises a pair of struts or longerons 3, 4, joined at their upper and lower ends by cap pieces 5 which are identical save for the fact that the cap piece at the upper end is provided with a hole at 6 through which the shaft 7 extends. Each cap piece comprises a transverse end member 8 and spaced flanges 9, 10, 11 and 12. These flanges are arranged in pairs. The kerf or pocket 13 between the pair of flanges 9 and 10 receives, preferably with a slight frictional fit, the end of the longeron 3. The like pocket 14 between the pair of flanges 11 and 12 receives the end of longeron 4. Since the parts are not subjected to any particular stress, it is only necessary that there be sufficient friction to maintain them in assembly until they are subjected to the tension of the rubber band motor as hereinafter described.

The shaft 7 may comprise a piece of wire formed at its lower end with a hook at 15. Above the upper cap member 5 the wire extends preferably through a series of washers 16 and through the oblong block 17 which is provided at 18 with a hole for the wire. The end of the wire is formed into a hook at 19 as shown in Fig. 1 to engage the side of the block 17, thereby constraining the block to rotate with the wire upon the bearing provided by the washers 16 and the upper cap piece 5.

The block 17 serves as a propeller hub. Kerfs or slits 20, 21 are cut approximately diagonally and of opposite angle to receive the blades 22, 23 respectively.

Here again friction is ordinarily adequate to assure that the assembly is maintained.

The motor comprises an endless elastic band 25 of rubber or the like, which at its upper end is hooked into the recess 15 of the propeller shaft 7 and at its lower end is engaged about the removable cap piece 5 as shown in Fig. 1. Even when unwound the motor band will preferably be under slight tension to hold the cap pieces 5 securely to the ends of the longeron frame members 3, 4. As the band is wound, the tension is increased.

In order that torque may be transmitted to the propeller 23 it is necessary to provide some means of absorbing the torque reaction communicated by the rubber band to the frame. If the frame could rotate freely, no torque would be transmitted to the propeller.

To absorb the torque reaction, I provide a counter propeller fixed to the frame and comprising a block 26. This block has a transverse reenforcing member 27 which spans the frame from side to side. The block is laterally notched at 28, 29, to provide channels similar to the pockets 13, 14, of the cap pieces 5 except that they engage the longerons frictionally from the side rather than at the ends. The block 26 is also provided with kerfs or slots 30, 31, which are oppositely inclined and pitched at slightly reduced angles as compared with the slots 20, 21, of the hub block 17.

The block 26 not only serves as a spacer which rigidifies and supports the longerons 3, 4, against collapse under tension of the motor band 25, but also serves as a hub for the counter propeller blades 32, 33. These blades may be identical with the blades 22, 23 but the overall diameter of the counter propeller is greater than that of the primary propeller, due to the fact that the block 26 is somewhat longer and, consequently, supports the blades 32, 33 at a slightly greater radius from the motor band 25. A channel at 34 accommodates the motor band so that the block 26 may be frictionally engaged laterally with the longerons.

The pitch of the counter propeller blades 32 and 33, as determined by the angularity of slots 30, 31, is preferably slightly less than the pitch of blades 22, 23 of the primary propeller partly because of the difference in diameter of the two propellers. The spacing between the two propellers should be approximately as illustrated in Fig. 1 but different operators may prefer to vary the spacing to meet their own concepts or to meet any particular conditions of flight. The frictional engagement of block 26 laterally with the longerons permits such block to be moved at will to the point where the spacing gives the best results.

While any desired material may be used, I have found balsa wood to be particularly suitable, particularly for the longerons and propeller blades, not only because it is light but because its surface is such as to be very effective in providing such friction as is desired for the best functioning of the parts frictionally assembled in the manner described. However, for strength, I may use other materials such as plastics or plywood. Plywood has been found desirable for the cap pieces 5 and the pieces 17 and 26 which serve as propeller hubs.

The band motor 25 is wound up by rotating the primary propeller hub 17 with respect to the frame until considerable torque energy is stored in the motor. Thereupon the primary propeller is released and permitted to rotate. As it rotates in one direction the entire frame will be slowly rotating in the other. Lift will be imparter to the toy helicopter by both propellers, the blades of the respective propellers being oppositely pitched because of their mutually opposite directions of relative rotation. The device will readily rise in the air and continue in flight until the rubber band motor runs down.

The parts all being held together frictionally is a great advantage in a device intended to be sold knocked down and assembled by the purchaser. Neither nails, screws, staples or adhesives are required. It is also an advantage in making adjustments of the counter propeller as previously described. It is also an advantage in making repairs and replacements since any part damaged can be almost instantly replaced. It also provides a means for readily replacing a broken rubber band motor. The fact that the band is endless might afford problems if any more permanent means were employed to connect the lower cap member with the longeron members. As disclosed, it requires but a moment of time to remove the lower cap member, passing it through a new band and replacing it on the longeron members, whereupon the band may be engaged with the propeller shaft and the device is again in readiness for flight. The only parts tending to become displaced in normal use are the propeller blades and these may be cemented in their respective slots if desired. The adaptability of the parts to friction connection is an important advantage but does not preclude more permanent fastening at any point.

I claim:

1. A toy helicopter comprising a pair of longerons, cap members spanning the longerons at their respective ends and each provided with a pair of spaced, transversely extending, open-ended channels in which the ends of the longerons are seated, a propeller shaft extending through one of said cap members, a propeller carried thereby, a band motor connected with the propeller shaft and extending under tension between said longerons and engaged about the cap member at the opposite end of the longerons from the propeller shaft, and reaction absorbing means carried by said longerons and comprising means connecting intermediate portions of the longerons against relative displacement under tension of said motor.

2. The device of claim 1, in which such reaction absorbing means comprises a counter propeller pitched oppositely to the propeller first mentioned and having a supporting portion frictionally mounted upon said means connecting the longerons intermediate the ends thereof.

3. In a toy helicopter the subcombination which comprises a frame having spaced longitudinal members, an elastic motor extending therebetween and tensioned between the ends of the frame, and a transverse brace member provided with channels engaged with said longitudinally extending members to span said frame at one side thereof and provided with a central notch affording clearance for said elastic motor between said longitudinally extending members.

4. The subcombination set forth in claim 3, in which the transversely extending member comprises a counter propeller hub provided at its ends with blades at either side of said frame.

5. The subcombination set forth in claim 3 in which the transversely extending member comprises a counter propeller hub provided at its ends with blades at either side of said frame, said transversely extending member having diagonally disposed slots oppositely inclined in which the respective blades are positioned.

6. A toy helicopter comprising a pair of laterally spaced longerons, cap members provided with channels in which the ends of the longerons are respectively engaged to constitute, with said longerons, a frame, a propeller shaft rotatably carried by one of said cap members and provided between said longerons with a means for attaching an elastic motor, an endless elastic band motor engaged with said means and extending between said longerons and engaged about the cap member at the other end thereof from the member in which the propeller shaft is carried, a propeller hub connected with the propeller shaft to rotate therewith, thrust bearing means supporting the hub from the cap member which carries the propeller shaft, the hub being provided at its ends with diagonal slots of opposite angularity, blades engaged in said slots to rotate with said hub as a primary propeller, and a combination counter propeller and brace intermediate the ends of the longerons comprising a member transversely spanning the space between the longerons at one side thereof and having channels in which the longerons are frictionally laterally engaged, the portion of such member between said channels being recessed to accommodate said motor and the ends of said member projecting beyond the longerons being provided with diagonal slots of opposite angularity, and blades positioned in said slots, the pitch of said counter propeller blades being opposite to the pitch of the blades first mentioned.

7. The device of claim 6, in which the pitch of the counter propeller blades is less than the pitch of the blades first mentioned, the blades per se being substantially identical and the counter propeller blades being supported at a greater radius from said motor than the blades first mentioned.

WILLIAM T. LEWIS.

REFERENCES CITED

The following references are of record in the file of this patent:

UNITED STATES PATENTS

| Number | Name | Date |
|---|---|---|
| 202,281 | Mettam | Apr. 9, 1878 |
| 2,138,168 | Horak | Nov. 29, 1938 |
| 1,294,917 | Koontz | Feb. 18, 1919 |

FOREIGN PATENTS

| Number | Country | Date |
|---|---|---|
| 21,181 | British | Oct. 7, 1908 |
| 324,780 | French | Sept. 30, 1902 |
| 215,894 | British | May 22, 1924 |